June 24, 1958  A. FOWLER  2,840,135
CONTROL FOR PRESS BRAKE
Filed March 4, 1955  6 Sheets-Sheet 1

INVENTOR.
ALEXANDER FOWLER
BY James and Franklin
ATTORNEYS

FIG.4.

INVENTOR.
ALEXANDER FOWLER
BY
James and Franklin
ATTORNEYS

FIG. 14

United States Patent Office 2,840,135
Patented June 24, 1958

2,840,135

CONTROL FOR PRESS BRAKE

Alexander Fowler, Stamford, Conn.

Application March 4, 1955, Serial No. 492,259

20 Claims. (Cl. 153—21)

This invention relates to press brakes, and more particularly to a largely automatic control mechanism for simplifying and improving the operation of the same.

The press brake is here assumed to be mechanically driven. A high speed shaft and a friction clutch are geared through reduction gearing to a slower speed shaft driving pitman mechanism connected to a ram which moves toward and away from a stationary bed. The shaft preferably carries a flywheel and runs continuously at uniform speed. The operator depresses a treadle to engage the clutch, thus bringing the ram down to the work, whereupon the treadle may be released and again depressed at intervals to "inch" or gradually bend a piece of sheet metal. A large sheet should not be bent at high speed because it may whip and distort or kink the remainder of the sheet, and there is also danger to the operator.

The primary object of the present invention is to generally improve the control of press brakes. It has already been proposed to provide a press brake with a top limit switch to stop the press when the ram reaches the top of its stroke. It has further been proposed to provide the press with a limit switch which stops descent of the ram at a predetermined point, here referred to for convenience as the initial engagement of the work by the ram, although in fact it is a die carried by the ram that engages the work.

A more particular object is to provide for a succeeding movement of the manual switch (by which I mean to include also a foot switch) to cause a slip engagement of the clutch for slow movement of the ram until the end of its down stroke. Thereupon the engagement of the clutch is changed from slip to full until the ram has been raised to top position, when the clutch is disengaged. Thus the ram moves downward and returns upward at full speed when it is not working, but during its working time it moves at slow speed, thereby eliminating whipping, kinking or other spoilage. The operator may be relatively unskilled, and operator fatigue is minimized. The point at which the descent of the ram is arrested, preliminarily to starting slip engagement of the clutch, is readily adjusted to take care of changes from time to time in the work being done.

Still another object is to provide mechanism and electrical circuitry of different types, for effectuating the invention. A further object is to provide apparatus which is readily adapted to be mounted on standard press brakes. A still further object is to provide the circuitry with a number of switches which make possible changes in the mode of operation of the invention.

For example, the press brake may go from full engagement to slip engagement on reaching the work, without stopping therebetween, or, as is more usually done, the machine may stop on reaching the work, thus giving the operator a final opportunity to accurately position the work. The resumed but slow movement may be caused either by another operation of the manual (foot) switch, or, if desired, by mere release of said manual (foot) switch. By another switch change in circuitry, both the stoppage and the slippage on reaching the work may be eliminated, thus putting the machine back under treadle control. Another switch change in circuitry retains the stoppage on reaching the work, but eliminates the slip engagement, and instead affords full engagement of the clutch during work. Acordingly, a general object of the invention is to provide for flexibility in mode of use of the machine.

To accomplish the foregoing objects, and other more specific objects which will hereinafter appear, my invention resides in the control mechanism and the elements thereof, and their relation to a press brake, as are hereinafter more particularly described in the following specification. The specification is accompanied by drawings, in which:

Figure 1:
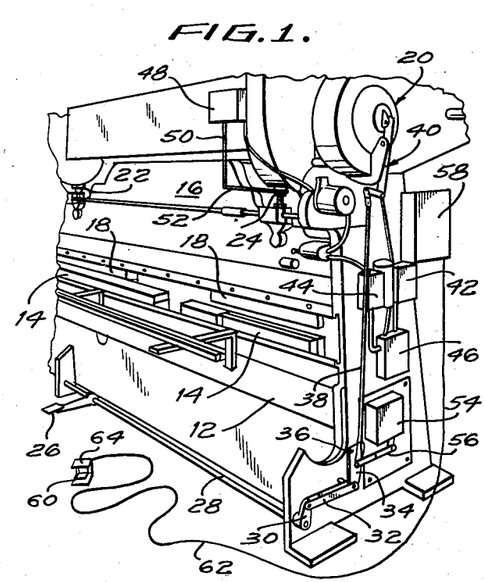
Fig. 1 is a perspective view showing a typical press brake equipped with the control mechanism of my invention.

Referring to the drawing, and more particularly to Fig. 1, the machine there shown is a conventional press brake. It comprises a driving shaft carrying a flywheel (not shown) and running continuously at uniform speed. There is a stationary bed 12 carrying appropriate lower tool or die elements 14, and a movable ram 16 carrying appropriate upper tool or die elements 18. Each end of the ram is supported by a pitman. In the present case these are located generally at 22 and 24.

A friction clutch generally designated 20 causes the drive shaft to move the pitmans and ram 16 toward the bed 12 and back again. The clutch 20 is ordinarily, and preferably, part of a clutch brake assembly, and both the clutch and brake are frictional and automatically operated in alternation, the brake being applied whenever the clutch is disengaged, and the brake being released whenever the clutch is engaged. For simplicity the clutch only of the clutch-brake assembly will be referred to, and any engagement or disengagement hereinafter referred to will apply to the clutch surfaces, but the clutch may be and preferably, though not necessarily, is a part of a clutch-brake assembly.

Figures 5, 15:
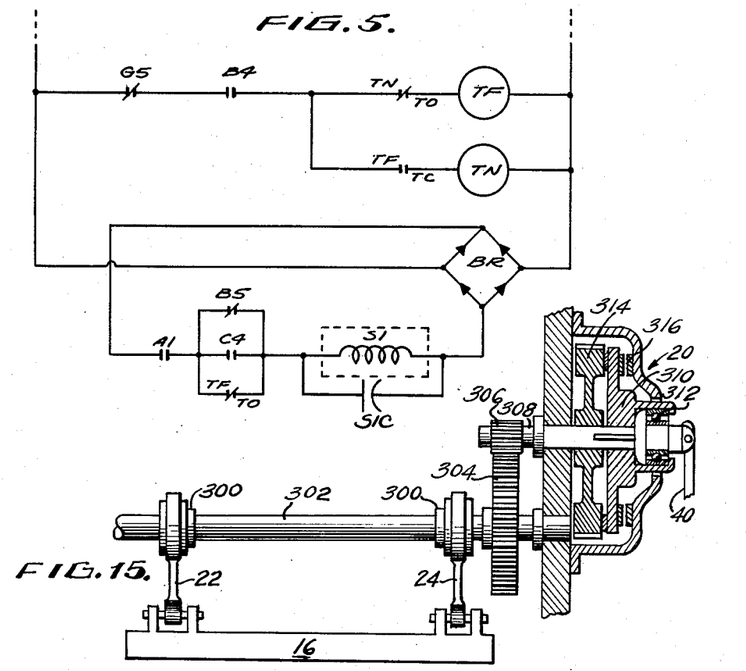
Fig. 5 corresponds to the lowermost part of Fig. 4, but illustrates a modification of the invention.
Fig. 15 is a schematic view explanatory of a conventional drive for a press brake.

Referring to Fig. 15, the pitmans at 22, 24 are simultaneously moved by eccentrics 300 carried on a shaft 302. This is driven by a gear 304 meshing with a pinion 306 carried on a shaft 308 splined to a friction disc 310 forming the axially movable part of the clutch-brake 20. Disc 310 is moved axially by lever 40 acting through an anti-friction bearing 312. When moved to the left, it frictionally engages a flywheel 314, which may also act as a gear which is continuously driven by the driving motor, not shown. When disc 310 is moved to the right, it frictionally engages a stationary brake surface 316.

The regular foot treadle for controlling the press brake is shown at 26. This turns a rod 28 moving an arm 30 which pulls a link 32 connected to an angle lever 34 pivoted at 36 and connected through an upright link 38 to the control lever system 40 of the clutch 20. The press brake is here assumed to be electrically driven, and the regular motor controls for the press brake are housed at 42, 44 and 46.

The apparatus of my invention is applied to the press brake in four units. One of these, marked 48, may be called a limit switch box, and is mounted on a top stationary part of the machine in such a position that it may be conveniently connected by means of an upright chain or rod 50 and a bracket 52 to a pitman mechanism, in this case at 24. The bracket 52 is preferably connected above the usual adjustable screw forming a part of the pitman, so that the adjustments within the limit switch box 48 will be independent of adjustments of the height of the ram 16 produced at the pitman screws.

A second main unit is the mechanism for operating the clutch linkage. In the present case this is an inverted solenoid housed in a box 54, and connected through a lever 56 to the angle lever 34 and upright rod 38 previously referred to.

A third unit is a main control panel 58 which contains the circuitry of my invention other than the limit switches in box 48, the solenoid in box 54, and a manual (foot) switch 60, which is the fourth unit. The latter is connected to the main control panel 58 through a flexible cable 62 so that it may be placed wherever most convenient. It is operated by downward pressure, and thus corresponds to the depression of the mechanical foot treadle 26. The switch may be protected by an overhanging top ledge 64 to prevent accidental depression of the switch. It will be understood that on a large machine handling large sheets requiring two men, one at each end of the sheet, two such foot switches may be provided, connected in series so that the press brake will not function unless both operators want it to. Conversely, on a small press brake a hand button may be provided instead of a foot switch, and two such buttons may be arranged in series for safety, to require both hands of the operator to be out of the press. For convenience such bodily controlled switches will be referred to as "manual," even though they may be foot operated in many cases.

Figure 2:
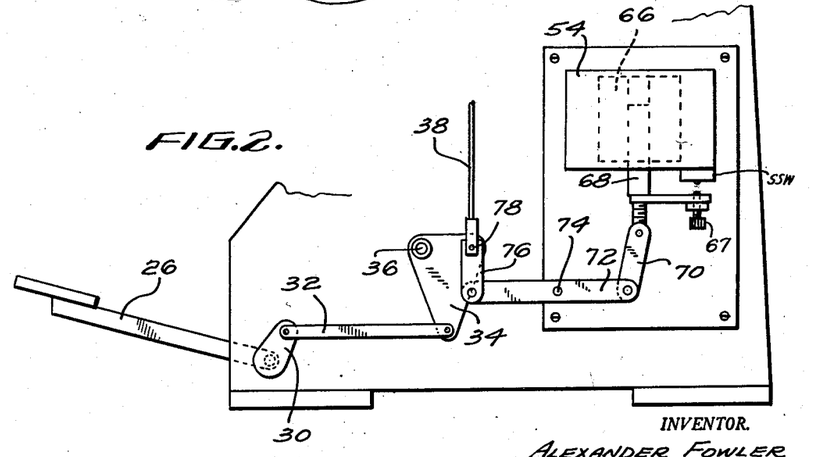
Fig. 2 is an elevation drawn to enlarged scale and showing how a clutch operating solenoid may be connected into the regular treadle linkage of the press brake.

The connection between solenoid box 54 and the clutch linkage is shown in greater detail in Fig. 2, in which it will be seen that when solenoid coil 66 is energized, the solenoid core 68 is pulled upward, and through link 70 turns lever 72 about its pivot 74, thus pulling link 76 which is connected by a pin 78 to both the upright rod 38 and the angle lever 34, the latter being pivoted at 36. Operation of either treadle 26 or solenoid 66 pulls the rod 38 down, and this engages the clutch. When core 68 rises an adjustable screw 67 trips a switch SSW, which releases the solenoid again, resulting in a pulse action, as later described.

Figure 3:
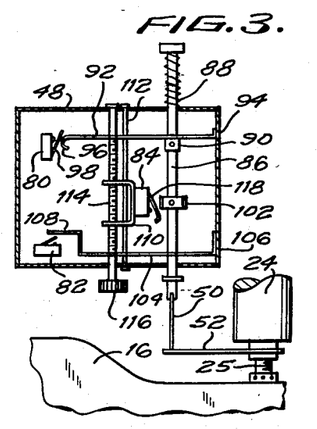
Fig. 3 is a diagrammatic showing of limit switches which form a part of my improvement.

Referring now to Fig. 3, the limit switch box is shown at 48, and is connected by a rod or chain 50 and a bracket 52 to the capstan 24. The latter is connected to one end of ram 16 by a usual adjustable capstan screw 25, and the bracket 52 is preferably connected above screw 25.

There are three limit switches within box 48, these being indicated at 80, 82 and 84. The switches are precision over-the-center or snap switches, a typical commercial example of which is the "microswitch." An actuating rod 86 is vertically slidable in box 48 and is normally urged upward by a compression spring 88. The rod 86 has a collar 90 adapted to bear against a movable member 92 secured to box 48 at 94, and the opposite end 96 of which acts as a cam bearing against a leaf spring 98, which in turn bears against the projecting pin of switch 80. The parts are suitably adjusted, as by changing the position of collar 90 on rod 86, or by changing the length of the connection 50, so that limit switch 80 is operated at the "up" position of the ram. It should be understood that the adjustment is approximate in the sense that some may prefer to stop the press slightly off dead center instead of at dead center.

The switch 82 is a down limit switch, and is operated in the present case by another collar 102, preferably adjustably fixed on rod 86. When the ram descends the rod 86 is pulled down until collar 102 bears against an arm 104, which is secured to box 48 at 106, and the opposite end 108 of which bears against and operates the switch 82. Here again I shall for convenience refer to the "down" position of the ram, but the adjustment is approximate in the sense that some may prefer to operate the switch slightly ahead of dead center for reasons later explained.

The third switch 84 may be called a "preset stop" switch, and is mounted on a vertically movable yoke 110 which is vertically slidable on a guide rod 112. Its position is adjustable by means of a screw 114, turned by an adjusting knob 116. Switch 84 is operated by collar 102, which rides past a leaf spring 118 and so bears against the operating pin of the switch. The position of switch 84 is adjusted to correspond to a desired point intermediate the "up" and "down" positions, and it usually corresponds to initial engagement of the work by the ram-carried tool or die elements. For simplicity this is referred to as initial engagement of the work by the ram. Here again the definition is intended to be approximate, for some may prefer to adjust the switch to stop the ram just before reaching the work, say a metal sheet, so that the sheet may be readjusted more accurately in respect to the die just before the die bears on the sheet. Others may prefer to position the sheet accurately before contact, and to permit actual pressure on the work before stopping the ram or changing its motion to a slow speed motion.

Figure 4:
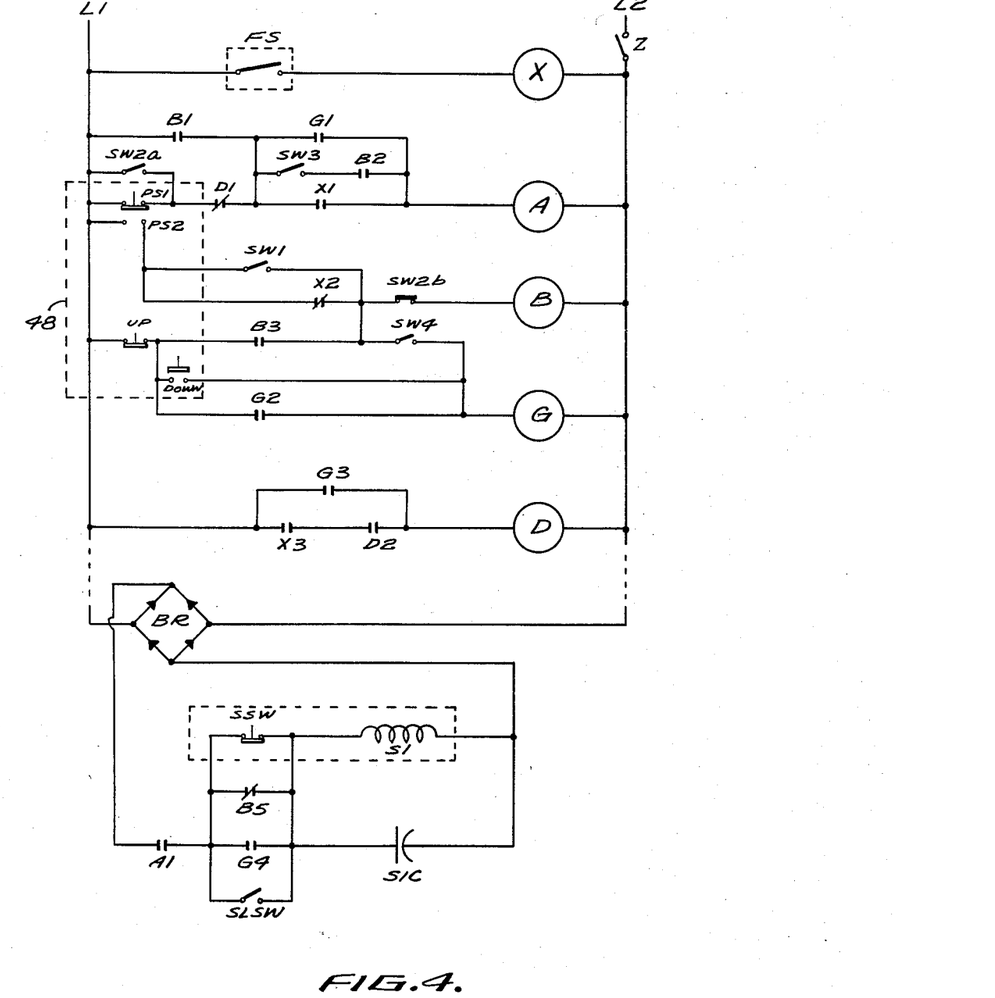
Fig. 4 is a wiring diagram for the apparatus shown in Figs. 1, 2 and 3.

The wiring diagram for the apparatus as so far described is shown in Fig. 4. This is an across-the-line diagram, with the main lines indicated at L1, L2. The normally open contacts are indicated by spaced vertical lines. Normally closed contacts have an added diagonal line. The circles X, A, B, G, and D represent solenoid relay coils, and the contacts operated by these relays are represented by the same letters with following numbers.

The basic diagram of Fig. 4 is simpler than that there shown, for the circuit may be used without the switches SW1, SW2a, SW2b, SW3 and its series relay contacts B2, SW4 and SLSW. The said switches have been added for special purposes which will be described later, and any or all of these switches may be eliminated, depending on whether or not the ability to readily make certain changes in operation is desired.

The coil of the main clutch operating solenoid is shown at the bottom of the diagram at S1. The main manual (foot) switch is shown at the top of the diagram at FS. A bridge rectifier BR is employed when it is desired to drive the solenoid by direct current. This is a refinement which is not essential, and alternating current may be used, although there are advantages in using direct current. The top of the bridge BR is considered plus, and the bottom minus. A dotted rectangle 48 corresponds to the limit switch box, and houses the three limit switches which are marked "up" (corresponding to switch 80 in Fig. 3), and "down" corresponding to switch 82 in Fig. 3), and the intermediate preset stop switch, which is a double throw switch marked PS1, PS2 (and which corresponds to switch 84 in Fig. 3).

The operation may be described as follows: The ram is assumed to be at the top of its stroke. Electric power is applied to L1 and L2 (usually A. C.) and on-off switch contacts Z are closed. The main driving motor of the press brake is running, and the ram is moved by engagement of the clutch, which is accomplished by actuation of the solenoid S1. The ram is stopped when the solenoid is released, because the clutch is coupled with a brake.

The switches are set for Preset Stop, Slip, Self-Return, and Non-Repeat. The SLSW (slip switch) contacts are open; SW1 contacts are open; SW2a contacts are open; SW2b contacts are closed; SW3 is open; and SW4 is open.

The material to be formed is placed in the press brake containing the forming dies. Foot switch FS is depressed and its contacts close. This energizes relay X through line L1, foot switch FS, switch Z, and line L2, causing X1 contacts of relay X to close, and consequently energize relay A through circuit L1, limit switch contacts PS1, relay contacts D1, relay contacts X1, relay coil A, switch Z–L2. Contacts A1 close and solenoid S1 is energized through the top of bridge rectifier supply circuit BR plus, contacts A1, contacts B5 through solenoid S1 to the bottom of BR minus, which receives its A. C. power through the L1–BR–Z–L2 circuit. When solenoid S1 is energized its plunger pulls in and actuates the clutch, causing the ram to move downward.

The ram will continue its downward movement as long as foot switch FS is closed, and until preset stop switch PS is tripped (usually at the point the die engages the material to be formed) whereupon its contacts PS1 open and PS2 close. The opening of contacts PS1 de-energizes the (A) relay circuit, opening contacts A1, thereby de-energizing solenoid S1 and causing the ram to stop. Capacitor S1C causes an oscillatory discharge through S1 and S1C circuit, resulting in quick release of solenoid and less arc across A1 contacts.

Upon releasing the foot switch, contacts FS open, de-energizing relay (X) causing X2 contacts to close, thereby energizing relay (B) through circuit L1, preset stop contacts PS2, relay contacts X2, switch SW2b, relay coil (B), switch Z–L2. This initiates the slip stage. Relay (B) is maintained energized through L1, "up" limit switch, relay contacts B3, switch SW2b, relay coil (B), switch Z–L2.

Upon depressing the foot switch again its contacts FS close energizing relay (X) through circuit L1–(X)–Z–L2, causing relay (A) to be energized through the circuit L1–B1–X1–(A)–Z–L2, thereby causing the solenoid S1 to become energized through the circuit BR plus –A1–SSW–S1–BR minus-circuit. The B5 contacts are open because relay (B) is now energized. The solenoid plunger will pull in until the SSW switch contacts are opened, and then release, resulting in a pulsing action, somewhat similar to a buzzer action. This causes the clutch to be only partially engaged, or in effect to slip to a controlled degree, and thereby to move the ram downward slowly. This prevents whip and kink of the material.

The ram continues its downward movement until the "down" limit switch is tripped, which is preferably at a point about 1/16" before the bottom of the stroke. Its contacts close, causing relay (G) to become energized through circuit L1, "up" switch, "down" switch, relay coil (G), switch Z–L2. Relay (G) is maintained closed through circuit L1, "up" switch, relay contacts G2, relay coil (G), Z–L2. The energizing of relay (G) eliminates the pulse action of the solenoid plunger because relay contacts G4 shunt the SSW contacts, thereby maintaining the solenoid circuit continually energized regardless of the plunger position.

Upon relay (G) becoming energized, the slip stage is completed, and the operator is no longer required to keep foot switch FS closed (depressed). Relay (A) is energized through circuit L1, contacts B1, contacts G1, relay coil (A), Z–L2. Contacts G3 of relay (G) also energize relay D through circuit L1, contacts G3, relay coil (D), Z–L2. The solenoid is now energized through the circuit from top of bridge BR plus, contacts A1, contacts G4, solenoid S1, back to BR minus, and completely engages the clutch, causing the ram to continue any necessary slight additional movement downward until the material is completely formed, and then upward until the "up" limit switch is tripped.

The ram then stops at the top of its stroke (or somewhat over the top of the stroke, depending upon the braking time and the stop position desired). This stopping is accomplished by de-energizing the solenoid as a result of "up" limit switch being tripped, and its contacts open regardless of whether the operator maintains foot switch contacts FS open or closed. The opening of "up" limit switch contacts de-energizes relay (B) and relay (G), thereby de-energizing relay (A); the contacts A1 open, which de-energizes the solenoid S1.

If FS contacts are open (foot switch released after "down" switch was tripped), relay (X) is de-energized, contacts X1 are open, contacts G1 are open as a result of relay (G) having been de-energized; therefore relay (A) is de-energized and its contacts A1 open to release solenoid S1. However, if foot switch FS is maintained closed, relay (X) is maintained energized, and its contacts X3 maintain relay (D) energized through the L1–X3–D2–(D)–Z–L2 circuit. Therefore contacts D1 are maintained open and consequently the circuit of relay (A) is open, because contacts B1 have been opened when relay (B) was de-energized by the opening of the contacts of the "up" switch. Releasing foot switch FS (opening its contacts) then de-energizes relay (D) by opening contacts X3.

The finished work may be removed from the press and a new sheet of metal inserted. The cycle can then be repeated.

With the switches set as indicated in Fig. 4 the operation described above, that of Preset Stop, Slip (slowed ram speed by pulsing), Self Return, and Non-Repeat is obtained.

However, numerous variations of the above operation are possible, some of which are as follows:

One such variation is to omit stopping the ram between its initial fast descent, and its slow descent after reaching the work, that is, the Preset Stop.

By closing the switch SW1 contacts, it is possible to obtain the above described operation except for the Preset Stop. When the SW1 contacts are closed and the ram reaches the point where Preset Stop switch PS is tripped, relay (B) is energized through the L1, preset stop contacts PS2–SW1–SW2b–relay coil (B)–Z–L2 circuit, and maintained energized by the circuit through L1–"up" limit switch, relay contacts B3–SW2b–relay coil (B)–Z–and L2. Contacts B1 then are closed and shunt the preset stop contacts PS1 and the D1 contacts. This maintains relay A energized, and with relay B energized, the circuit is in the work forming or slip stage, without the ram having stopped. With the foot switch contacts FS still closed, the ram continues down slowly, forming the metal, and the cycle continues without the operator having had to release and again depress foot switch when the work was reached.

Another variation available in the circuitry of Fig. 4 is to eliminate both the intermediate stop and the clutch slippage or slow speed operation, so that the press runs straight through the whole cycle, except that it remains under treadle control at all times, by using the mechanical treadle 26 shown in Figs. 1 and 2.

When the switch SW2 is set so that the SW2a contacts are closed and the SW2b contacts are open, no change takes place when the Preset Stop switch PS is tripped, that is when the ram opens PS1 contacts and closes PS2 contacts. Contacts SW2a maintain the circuit of relay (A) closed when the preset PS1 contacts open, and with contacts SW2b open, relay B cannot be energized. This maintains clutch solenoid S1 energized when the foot switch is kept depressed so that contacts FS are closed. The relay A is energized through circuit L1–SW2a–D1–X1–(A)–Z–L2 and bridge rectifier supply BR plus –A1–B5–solenoid S1–BR minus, until the ram reaches and trips down limit switch, energizing relay (G), whereupon the self-return circuit takes over and the cycle continues, with the ram continuing its downward movement at full speed.

In another circuitry variation the foot switch is made effective in both directions, so that when depressed the ram comes down to the preset stop point, and then when the foot switch is raised, and without having to again depress the same, the ram continues its slow speed descent. The press operation is much as first described, the main difference being in saving a double downward depression of the foot switch.

By closing the switch SW3 the original conditions of Preset Stop, Slip, Self Return, and Non-Repeat are retained, but this time the change from the Preset Stop position to the slip stage is obtained by simply releasing the foot switch FS, instead of by releasing it and then again depressing it to continue cycle. When the SW3 contacts are closed this action is obtained as follows: At preset stop, relay (B) becomes energized upon releasing foot switch when contacts FS open. This energizes relay (A) through the L1–B1–SW3–B2–relay (A)–Z–and L2 circuit, and brings the circuit to the stage that originally followed when the foot switch was depressed a second time. The cycle then continues.

Still another variation uses the foot switch in the same way, but eliminates the clutch slippage or slow speed descent, that is, depressing the foot switch brings the ram down to the work where it stops, and raising the foot switch permits the ram to continue with full clutch engagement.

By closing the switch SW4, the same conditions are obtained as with switch SW3 closed, but this time with full clutch engagement. The ram comes down to Preset Stop and is stopped. Upon releasing the foot switch FS the clutch is again fully engaged and completes the stroke. With SW4 contacts closed, and relay B energized, when foot switch contacts FS are opened after the Preset Stop, relay (G) becomes energized through the L1–"up" limit switch–B3–SW4–(G)–Z–L2 circuit, and is maintained energized through the L1–"up" limit switch–G2–(G)–Z–L2 circuit. Relay G in turn energizes relay A through the L1–B1–G1–(A)–Z–L2 circuit, which in turn energizes clutch solenoid S1 through bridge rectifier circuit BR plus–A1–G4–solenoid S1–BR minus, and thereby engages the clutch fully, and the cycle continues.

A further variation is to retain the foot switch control as first described, but to eliminate only the clutch slippage. This is done by closing the switch marked SLSW. With the SLSW contacts closed there is no slip because the solenoid S1 circuit is completed through BR plus–A1–SLSW–solenoid S1–BR minus. The ram stops at the work until the foot switch is released and again depressed.

All of the foregoing changes are possible with the circuit of Fig. 4 as shown, and by mere manipulation of the extra switches provided for the purpose.

Referring now to Fig. 5 of the drawing, I there show a modification of the lower part of the wiring diagram shown in Fig. 4. In Fig. 4 it will be noted that the lower ends of the lines L1, L2 are shown dotted, and in Fig. 5 the dotted lines at the upper left and right corners correspond to these same parts, so that the diagram shown in Fig. 5 replaces what is shown in Fig. 4 below the dotted connections.

This circuit represents a refinement in using two timing devices marked "TF" and "TN" to accurately time the pulsing of current through the solenoid. More specifically, the timer TN times the duration of the intervals during which current is supplied, and the timer TF times the duration of the intervals between pulses, when the current is off. These timers may be of the dashpot type, electronic type, or other commercial type of timer, and such timers are sold by General Electric Company of Schenectady, N. Y., Cutler Hammer, Inc. of Milwaukee, Wisconsin, and Square "D" Company of New York, N. Y.

In describing the operation of the circuit shown in Fig. 5 it is assumed to be connected into Fig. 4 as above explained. I add contacts G5 and B4 to relays (G) and (B). I add time delay relay TN with contacts TN, TO. These are normally closed contacts that open after delay of energizing relay TN coil. I further add time delay relay TF, with two sets of contacts. One set has contacts TF, TC which are normally open contacts that close after delay of energizing relay TF coil. The other set has contacts TF, TO which are normally closed contacts that open after delay of energizing relay TF coil. The contacts TF, TO replace the SSW switch of Fig. 4.

After the forming stage has been reached and relay B has been energized, but with relay G not yet energized, the timing circuit of slip (or pulse) operation of the clutch is obtained as follows: Time delay relay TF is energized through L1–G5–B4–TN, to–TF–Z–L2 circuit. After a desired delay (say one-half second), contacts TF, TC close, energizing time delay relay TN. After a desired delay (say one-fourth second) contacts TN, TO open, thereby de-energizing time delay relay TF, which in turn opens contacts TF, TC. This in turn de-energizes time delay relay TN, causing contacts TN, TO to close and energize time delay relay TF. The cycle repeats itself, with contacts TF, TO opening and closing simultaneously with contacts TF, TC, these contacts both being operated by relay TF. Contacts TF, TO would in the above case be closed one-half second and open one-quarter second. The adjustment is generally made such that the clutch is not completely pulled in nor is it completely released, thereby slipping the clutch. This action continues until the ram forms the material being worked. After the material is almost completely formed the "down" limit switch is tripped, closing relay G and so fully engaging clutch, etc., all as previously described.

A slightly changed circuit arrangement for pulsed solenoid operation, with the pulses timed by means of two timers, one for the pulses, and the other for the intervals, is shown in Fig. 6, which again corresponds to the lower portion of the complete diagram shown in Fig. 4. As before I add normally closed contacts G5 to relay G and normally open contacts B4 to relay B. I add time delay relay T1 with a set of normally open contacts T1, TC which close after time delay when T1 coil is energized, and I add time delay relay T2 with two sets of normally closed contacts T2a, TO and T2b, TO, both of which open after time delay when T2 coil is energized. After the forming stage has been reached, with relay B energized and relay G not yet energized, the timing circuit or pulse operation of the clutch is obtained as follows.

Figure 6:
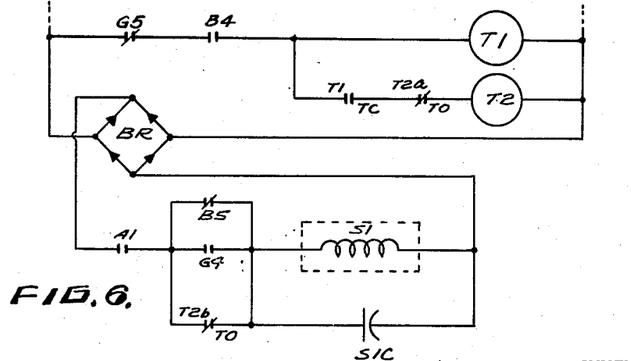
Fig. 6 shows still another modification of the same portion of the wiring diagram.

Time delay relay T1 is energized through the L1–G5–B4–T1–L2 circuit, causing its contacts T1, TC to close after a delay. After T1, TC contacts close, time delay relay T2 becomes energized through the L1–G5–B4–T1, TC–T2–L2 circuit. After a delay both contacts T2a, TO and T2b, TO open, thereby opening the clutch solenoid circuit and deenergizing the solenoid, and opening T2 time delay relay circuit, de-energizing the relay, and thereby instantly closing T2a, TO and T2b, TO contacts, which again re-energizes the solenoid and re-energizes the T2 time delay relay. The action is repeated to produce the desired pulses.

The delays of relays T1 and T2 are independently adjustable. As before mentioned, the adjustment is generally made such that the clutch does not completely pull in nor is it completely released, thereby slipping the clutch. After the work is almost completely formed the bottom limit switch is tripped, thereby closing relay G and fully engaging the clutch.

As so far described the solenoid has been operated intermittently or in rapidly repeated pulses for slip engagement. It is also possible to operate the solenoid continuously but with reduced force, for slip engagement. This may be accomplished in a number of ways, some of which are described hereinafter.

Figures 7, 8:
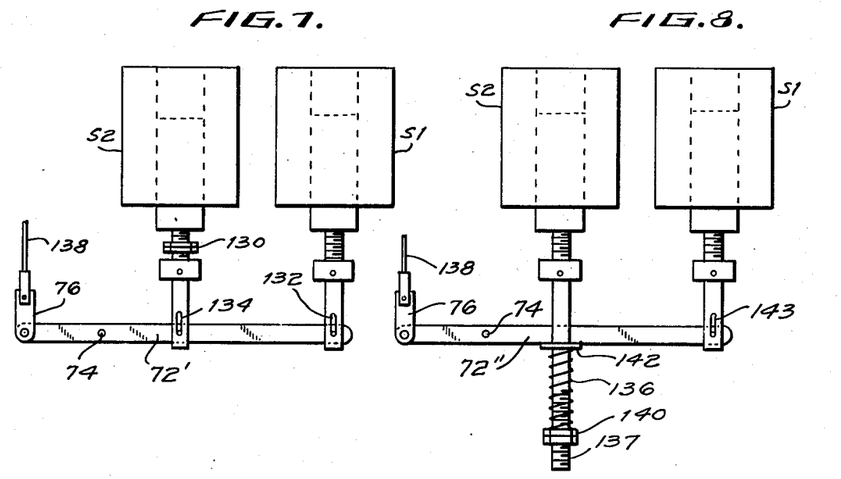
Fig. 7 is explanatory of a modified mechanism using two solenoids to operate the clutch.
Fig. 8 is generally similar to Fig. 7, but illustrates a further modification.

One system is based on the use of two solenoids acting on the clutch linkage, instead of one. Such an arrangement is shown in Fig. 7, which corresponds to the righthand part of Fig. 2. The lever 72 pivoted at 74 and connected to link 76 and rod 38, all correspond to the similarly numbered parts in Fig. 2. However, in Fig. 7 while the solenoid S1 provides full clutch engagement, the solenoid S2 provides slip engagement. For this purpose the core of solenoid S2 has an adjustable stop nut 130 which limits its upward movement against a stationary stop, not shown.

A pair of locknuts may be provided to fix the adjustment. The limited motion is so adjusted that the clutch is not fully engaged, and instead operates with enough slippage to provide the desired "inching" or slow operation of the press. The connections between solenoids and lever 72 may be by means of slots indicated at 132 and 134, thus providing lost motion, so that either solenoid may be operated without having to raise the core of the other solenoid.

Apart from the positive stop provided by the locknuts 130, it will be noted that the solenoid S2 is connected nearer the pivot 74 than is solenoid S1, and thus has reduced mechanical advantage, which alone may be used to reduce the clutch engagement and to afford slippage. However, I prefer to provide the locknuts in order to make possible a desired adjustability of the amount of slippage at the clutch.

The use of two solenoids as shown in Fig. 7 requires only a minor change in the wiring diagram, and this may be explained with reference to Fig. 9 of the drawing. It corresponds to the bottom portion of Fig. 4, and the two clutch operating solenoids are shown at S1 and S2. The operation of the circuit is as follows:

I omit the SSW switch and add contacts A2 to relay A and contacts B6 to relay B, together with the second solenoid S2 and its capacitor S2C. Assume the ram has reached the work and has stopped, and that the slip stage is wanted. Since relay B is energized and relay G is not yet energized, contacts B5 and G4 are open, and although contacts A1 are closed, the circuit to solenoid S1 is open, and therefore de-energized. However, since relays A and B are energized, solenoid S2 is energized through the BR plus–A2–B6 solenoid S2–BR– minus circuit. This causes the clutch to slip, and the ram to move slowly until the "down" limit switch is tripped, causing relay G to become energized and therefore energizing solenoid S1 through the BR plus–A1–G4 solenoid S1–BR minus–circuit. Solenoid S1 fully engages the clutch, thereby completing cycle, and becoming de- energized simultaneously with solenoid S2 when relay A is de-energized. Energization of solenoid S2 simultaneously with solenoid S1 is of no consequence, as the latter moves the lever 72 (Fig. 7) further than permitted by stops 130 of solenoid S2.

Figure 9:
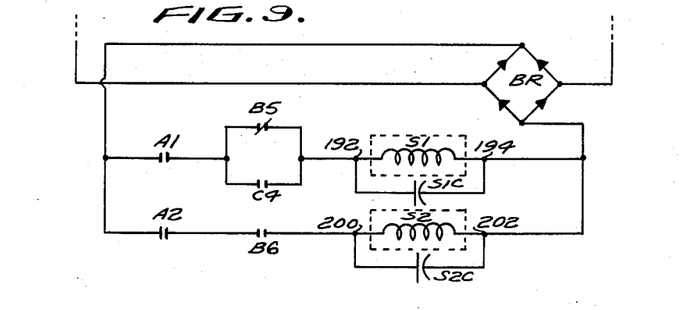
Fig. 9 is a wiring diagram which corresponds to the bottom portion of Fig. 4, and illustrates a modification applicable to the double solenoid arrangements of Figs. 7 and 8.

Two solenoids may be used as described above, and with the same wiring diagram as is shown in Fig. 9, but with a difference in the mechanical connection of the solenoids to the clutch linkage. Such an arrangement is shown in Fig. 8 in which the solenoid S1 is connected to lever 72 pivoted at 74, all as previously described. Solenoid S2 is connected to lever 72 through resiliently yieldable means, in this case a compression spring 136 surrounding a threaded rod 137, with the lower end of the spring bearing on adjustable locknuts 140, and the upper end of the spring bearing on a suitable plate or washer 142 which in turn presses against lever 72. One part or the other (rod 136 or lever 72) may be bifurcated in order to apply force symmetrically. The pull which is exerted by solenoid S2 on lever 72 is limited by the stiffness of the compression spring 136, and that in turn may be adjusted by means of the nuts 140. In addition the force of solenoid S2 is applied to lever 72 at reduced leverage or mechanical advantage, compared to solenoid S1. Slot 143 permits lost motion when solenoid S2 functions. Both S1 and S2 may operate together for full clutch engagement, if desired, as in wiring of Fig. 9 explained above.

Figure 10:
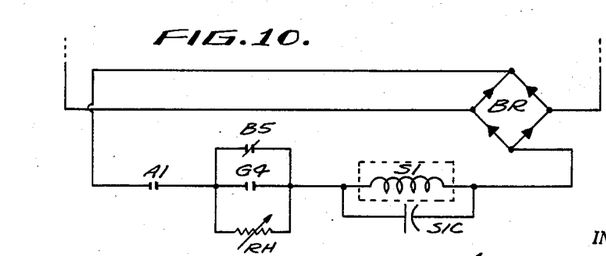
Fig. 10 shows still another modification of the bottom portion of Fig. 4, in which a single solenoid is arranged for energization at two different power levels.

It is not necessary to employ two solenoids in order to exert two different forces on the clutch linkage. If desired a single main solenoid may be used, as shown in Fig. 2, but the circuitry may be slightly modified to energize the solenoid with full power for full clutch engagement, and with reduced power for slip engagement. Such a modification is shown in Fig. 10 of the drawing, which again corresponds to the lowermost part of Fig. 4. The solenoid is indicated at S1. The reduced current supply is obtained by feeding the current through an adjustable rheostat RH. The adjustment of the rheostat determines the slippage of the clutch, and thus affords an easy and convenient adjustment for the purpose. The operation of the circuit may be described as follows:

The solenoid interrupter switch SSW of Fig. 4 is replaced with the rheostat RH. This reduces the solenoid current to the point where it pulls the clutch in only partway, and thereby slips the clutch. At this time relay B is energized, and relay G not yet energized, hence contacts B5 and G4 are open. The solenoid is energized through the bridge rectifier circuit BR plus–A1–rheostat RH–solenoid S1–BR minus–circuit. When relay B is de-energized and relay G is energized the contacts B5 and G4 are closed, shunting RH rheostat, and fully energizing the solenoid S1.

It will be understood that while I have shown a rheostat to reduce the current supply, any other suitable known method of reducing the current supply may be employed.

As so far described the force needed to engage the clutch has been obtained electrically by means of a solenoid. However, if desired, and particularly in plants which are piped with a compressed air supply, as is usually the case, this force may be obtained by means of an air cylinder instead of a solenoid. The operation of the air cylinder may be controlled electrically by means of a conventional solenoid operated air valve, and from the viewpoint of the circuitry so far described, for example Fig. 4, no change is needed other than to substitute a solenoid air valve for the solenoid S1 there shown.

Figures 11, 12:
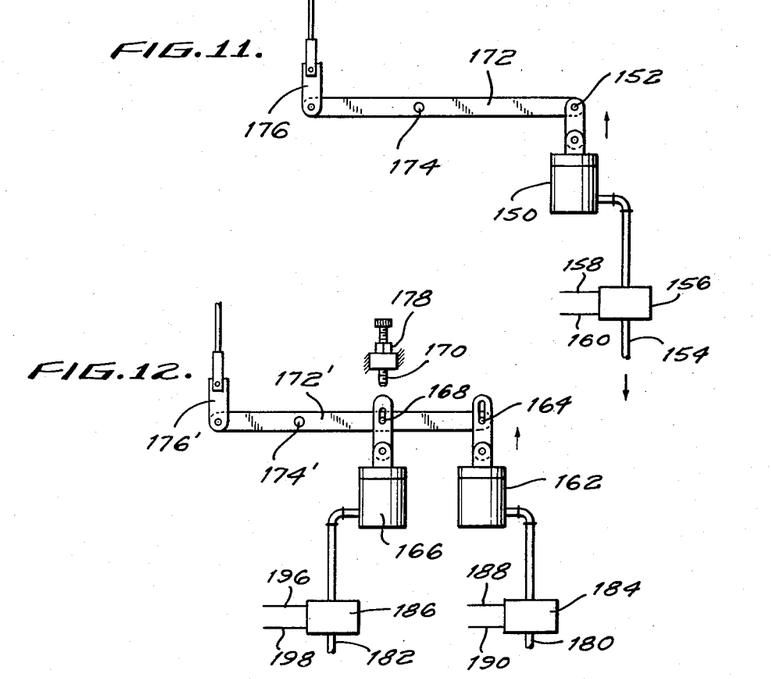
Fig. 11 corresponds to a portion of Fig. 2, but shows a modification in which a solenoid air valve controls the supply of air to an air cylinder, which in turn operates the clutch.
Fig. 12 corresponds to Figs. 7 and 8, and discloses a modification in which two solenoid air valves control two air cylinders.

Such an arrangement is illustrated in Fig. 11, in which an air cylinder 150 has its piston or diaphragm connected at 152 to lever 172 pivoted at 174 to link 176, which correspond to the parts 72, 74 and 76 shown in Fig. 2. The air is supplied by a pipe 154, and is controlled by an air valve 156. This is a solenoid operated air valve the solenoid coil of which is energized through electrical conductors 158, 160. This is connected into the wiring diagram of Fig. 4 in the same manner that the solenoid S1 is there connected, and the arrangement is such that each time the solenoid air valve is energized, air is admitted to air cylinder 150, thus causing clutch engagement. When the air valve is open continuously the engagement is full clutch engagement, but when the air valve is vibrated or pulsed, the clutch engagement is a slip engagement, all as previously described.

It is also possible to use two air cylinders controlled by two solenoid valves, in lieu of the two solenoids shown in either Fig. 7 or Fig. 8 of the drawings. Such an arrangement is shown in Fig. 12, and it corresponds generally to that shown in Fig. 7. Referring to Fig. 12, air cylinder 162 is connected at 164 to lever 172' which is pivoted at 174' and in turn connected to link 176', much as shown in Fig. 11. An additional air cylinder 166 is connected to lever 172' at 168. Its motion is stopped by an adjustable stop 170, the adjustment of which may be locked by a locknut 178. When air is supplied to cylinder 162 through pipe 180 the clutch is fully engaged, but when air is supplied to cylinder 166 through pipe 182 the clutch is only partially engaged and slips, the amount of slippage being adjusted at stop screw 170. The pipes 180 and 182 are connected to a common source and may, of course, be connected to one another. The connections at 164 and 168 may be slotted or lost motion connections as shown.

The air supply to cylinder 162 is controlled by a solenoid air valve 184, and the air supply to cylinder 166 is controlled by a solenoid air valve 186. These are connected in circuit exactly as shown for the solenoids S1 and S2 in Fig. 9 of the drawing, the conductors 188 and 190 being connected to the terminals 192 and 194 in Fig. 9, and the conductors 196 and 198 in Fig. 12 being connected to the terminals 200 and 202 in Fig. 9.

Figure 13:
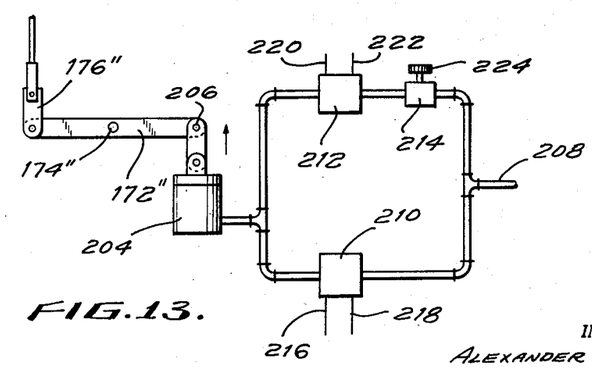
Fig. 13 corresponds generally to a modification described in connection with Fig. 10, but in which two solenoid air valves control the supply of air at two different pressures to a single air cylinder.

Instead of using two separate air cylinders it is possible to use a single air cylinder, and to supply air at higher pressure for full clutch engagement, and at lower pressure for slip engagement. Such an arrangement is shown in Fig. 13 of the drawing, in which a single air cylinder 204 is connected at 206 to lever 172'' pivoted at 174'' and connected to link 176'', much as previously described. The air supply is connected to pipe 208 which leads to air cylinder 204 through a solenoid air valve 210. There is another and parallel connection to air cylinder 204 through a solenoid air valve 212, but in this case there is also a pressure reducing valve 214 in series. Thus when solenoid air valve 210 is energized through its supply conductors 216, 218 the air cylinder 204 is operated at full pressure, which results in full clutch engagement. However, when solenoid air valve 212 is energized through its supply conductors 220, 222 the air cylinder 204 is supplied with air at reduced pressure, and this results in slip engagement of the clutch. The amount of slippage may be adjusted by adjusting the reduced air pressure, which in turn is done at the reducing valve 214, as by adjustment of a suitable handle 224.

The wiring diagram is the same as that shown in Fig. 9, it being understood that solenoid air valve 210 replaces the solenoid S1, with coductors 216, 218 connected to terminals 192, 194, and that solenoid air valve 212 replaces the solenoid S2, with conductors 220, 222 connected at terminals 200, 202.

It may be mentioned that it is common to employ alternating current with solenoid air valves, and accordingly the bridge rectifier BR of Fig. 4, and also the solenoid discharge capacitor S1C may be eliminated when using the arrangement shown in Fig. 11, and the corresponding bridge rectifier and the solenoid discharge capacitors S1C and S2C in Fig. 9 may be eliminated when using the arrangements of Fig. 12 and Fig. 13.

As so far described, the clutch may be either fully pulsed, or continuously slipped. However, it may be operated in a manner which is a compromise between these two, that is, it may be pulsed between a condition in which it is not fully engaged, and a condition in which it is not fully disengaged, producing a desired average slippage. Differently expressed, the clutch is pulsed at a relatively high frequency, and the operation is smoother and quieter, with less wear and tear on the mechanism, because the amplitude of the pulse is very small compared to a complete engagement or disengagement of the clutch. This limited or compressed pulse operation is obtained by using an electronic pulse circuit, an example of which is shown in Fig. 14 of the drawing, which replaces the bottom part of Fig. 4.

Figure 14:
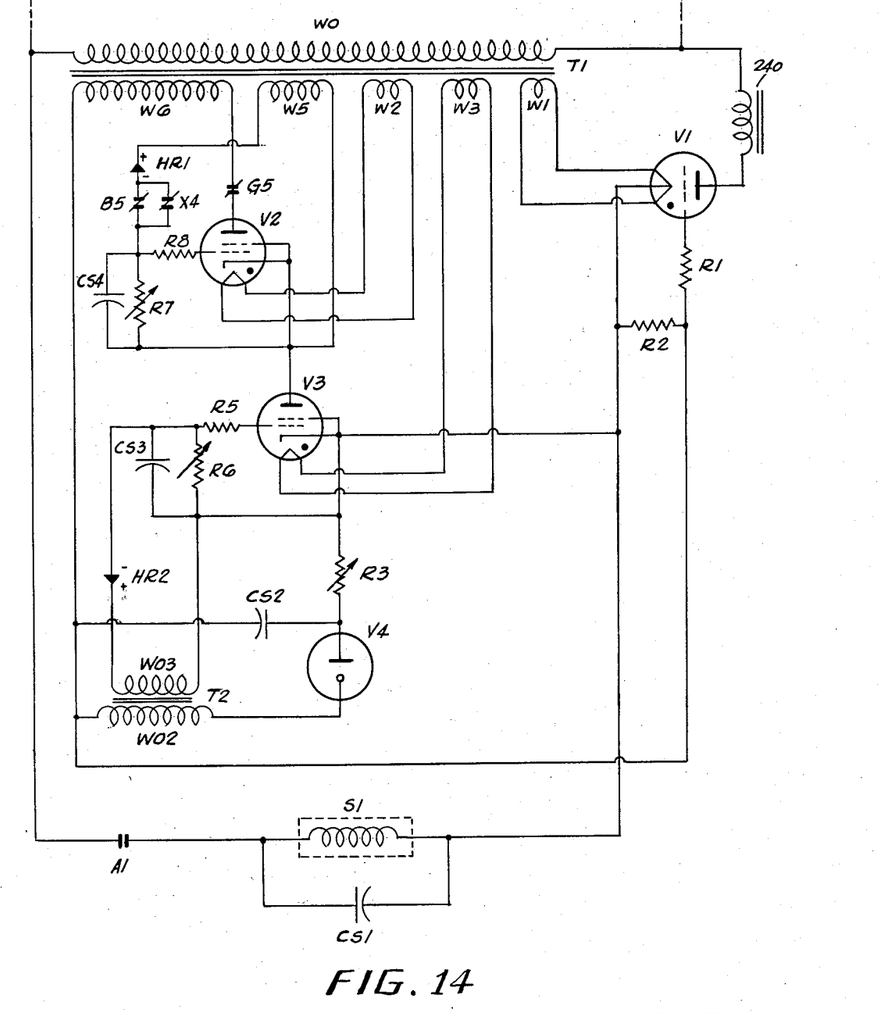
Fig. 14 discloses an electronic pulse circuit which is to be used in place of the lowermost part of Fig. 4.

The timing circuit of Fig. 14 has an initial stage to pull the clutch in to the point of just engaging. Thereafter each pulse includes an "off time" which permits the clutch to just release, and an "on time" which causes the clutch to just engage. After the initial stage the pulses are rapidly repeated until the work has been formed.

A grid controlled rectifier tube V1 is used as a switch and a power source, in place of the selenium dry disc rectifiers used in the previous circuits. This results in more accurate timing, because with selenium rectifiers the speed is limited by inertia and by arcing of the relay contacts in the timing circuit. Tubes V2 and V3 are grid controlled rectifier tubes used as inertialess switching elements. Tube V4 is a voltage regulator tube.

Referring to Fig. 14, the primary winding WO of the power supply transformer T1 is energized across the line (L1, L2 in Fig. 4) and supplies current to the secondary windings W1, W2, W3, W5, and W6. Winding W1 supplies filament current to grid controlled rectifier tube V1, winding W2 to tube V2, and winding W3 to tube V3. Winding W5 supplies grid voltage to tube V2, and winding W6 supplies plate voltage to tube V2, which in turn supplies plate voltage to tube V3, which in its turn supplies plate voltage to tube V4 through resistor R3. The circuit of tubes V2, V3, and V4 supplies a pulsing negative voltage to the grid of tube V1. Tube V1 supplies power to the main solenoid S1 through circuit L1 (Fig. 4), contacts A1 (Fig. 14), solenoid S1, tube V1, reactor 240, and L2 (Fig. 4), when the grid of tube V1 is not negative relative to its cathode.

During the period in which full engagement of the clutch is desired, when contacts B5 and contacts A1 are closed, the solenoid S1 is energized by the aforesaid circuit, which is a half wave rectifier circuit. Capacitor CS1 shunting solenoid S1 acts as a filter, supplying power to the solenoid during the negative half of the cycle when the tube V1 does not conduct, and also causing an oscillatory discharge when contacts A1 are opened, thus releasing the solenoid S1 quickly. Reactor 240 limits the plate current flowing to tube V1 to a safe value. The current flows when there is no negative potential at the grid of tube V1, for the tube conducts at zero as well as at positive grid potential. The grid to cathode circuit R1, R2 of tube V1 is at zero potential because no current is flowing through tube V3, which gets its plate voltage from tube V2, which in turn does not conduct because tube V2 has a negative potential on its grid. This is obtained by a circuit including the transformer secondary W5, rectifier HR1, contacts B5, and resistor R7 to the cathode of tube V2 and through the tube back to secondary W5. Capacitor CS4 is maintained charged negatively at the grid of tube V2 by the same circuit.

During the forming stage of the press, the contacts A1 close and contacts B5 open, causing solenoid S1 to become energized and to engage the clutch because the grid voltage of tube V1 is zero with respect to its cathode. Current flows through a circuit including L1 (Fig. 4), contacts A1 (Fig. 14), solenoid S1, tube V1, reactor 240, and back to L2 (Fig. 4). No current flows through the circuits of tubes V2, V3, and V4 because the grid of tube V2 is maintained negative by capacitor CS4 even when contacts B5 open, until the charge on capacitor CS4 leaks off through resistor R7 sufficiently to permit the conduction of current through tube V2. Meanwhile the tube V1 conducts or is "on" for the initial clutch engaging stage.

When tube V2 conducts, current flows through tube V3 because the grid to cathode potential of tube V3 is zero. This current flows through the circuit of transformer secondary W6, contacts G5, tube V2, tube V3, resistor R3, capacitor CS2, and back to secondary W6, and continues to flow, thereby charging up capacitor CS2. Meanwhile the tube V1 is off for pulse "off" time. When the charge on capacitor CS2 reaches the firing potential of voltage regulator tube V4, tube V4 conducts and discharges capacitor CS2 through tube V4 and winding WO2 of transformer T2. This flow of current through winding WO2 of transformer T2 induces a voltage in winding WO3 of transformer T2 which charges capacitor CS3 negatively (grid to cathode of tube V3) through the circuit including transformer winding WO3, rectifier HR2, capacitor CS3, and back to winding WO3, which in turn stops tube V3 from firing for the length of time the charge is sufficiently negative to prevent the tube V3 from firing. Tube V1 is on for the pulse "on" time. When the charge on capacitor CS3 leaks off through resistor R6 sufficiently to permit firing of the tube V3, current again flows through tube V3, thereby charging capacitor CS2 through resistor R3 as before, and the cycle is repeated, with alternate firing of tube V3, charging of capacitor CS2, discharging of capacitor CS2 through tube V4 and T2 winding WO2, resulting in an induced voltage in T2 winding WO3, which charges capacitor CS3, causing grid of tube V3 to be negative with respect to plate, and thereby cutting off the firing of tube V3 until capacitor CS3 is discharged through resistor R6.

The time of charging capacitor CS2, that is, the "off" time of the pulse, is a function of the value of resistor R3. The time of discharging capacitor CS3, that is, the "on" time of the pulse, is a function of the value of resistor R6. Both are variable rheostats, so that the time is adjustable in both cases. The pulse frequency may be of the order of ten to twenty cycles per second. Resistor R5 is used to limit the grid current of tube V3, and resistor R8 limits the grid current of tube V2. The time that it takes for the charge to leak off capacitor CS4 is the initial pulse time, and is determined by adjustment of the variable resistor R7.

During the period of time in which tube V3 conducts or fires, tube V1 is cut off and does not conduct. Solenoid S1 is de-energized because the current flowing through tube V3 causes the grid of tube V1 to become negative with respect to the cathode. The circuit includes transformer secondary W6, contacts G5, tube V2, tube V3, resistor R2, and back to secondary W6. Resistor R1 is used to limit the grid current flowing through the grid to cathode circuit of tube V1. The cathode connection of tube V1 is the center tap of the filament of tube V1. In tubes V2 and V3 the cathode is heated by a separate heater filament.

The described pulsing continues, and the ram of the press continues its downward movement, until the down switch (82 in Fig. 3) is tripped, which energizes relay G and opens contacts G5 (Fig. 14). By placing an additional set of normally closed contacts X4 of relay X across contacts B5, as shown in Fig. 14, the timing circuit may be made to start after the preset stop condition, but only if the foot switch is depressed.

With this system of Fig. 14, there is one relatively long movement of the clutch mechanism for the initial stage, and thereafter very short movements for all subsequent pulses, resulting in smoother, quieter operation and greater clutch life.

Instead of having the limit switches operated by a vertically slidable rod connected to the ram, as here shown in Fig. 3, it is also possible to provide a cam on the crank shaft to operate the limit switches, the switches being adjustable around the shaft, or to provide three cams each independently adjustable on the shaft, and each operating only one limit switch. Such an arrangement may be preferable in control mechanism designed and built into the press by the manufacturer of the press. However, the vertically slidable rod here shown is more convenient for installations made in the field, or on presses which have already been designed and built.

It is believed that the construction, method of installation and adjustment, as well as the operation and advantages of my improved control mechanism for press brakes, will be apparent from the foregoing detailed description. The readily made adjustment of knob 116 (Fig. 3) causes the ram to stop automatically (or to change to slow movement) at the exact desired point in the down stroke. The operator presses the manual (foot) switch until the ram reaches its predetermined stop point, whereupon the manual switch is released and again operated, which causes the ram to follow through to the end of its stroke, but at greatly reduced speed so that the work is not whipped, kinked or otherwise spoiled. The ram then returns to top position automatically, and at full speed. The operator does not have to wait for the ram to reach uppermost position, for the sheet may be removed while the ram is rising.

Changes may be made by simply shifting one or more switches in the control panel. For example, by flipping one switch, the manual (foot) switch may be doubly operated, with the brake started down by pressing the switch, and restarted at slow speed by raising the switch. The regular foot treadle of the press brake is retained and may be used by the operator when desired, and indeed, by changing certain switches in the control panel the press brake may be restored to full treadle operation. Other variants are possible, such as operation without any stop between full clutch engagement while descending toward the work and slip engagement during the work, or the elimination of slip engagement, either with or without a stop on reaching the work. Such changes may be combined with the previously mentioned change in the manual (foot) switch providing for operation on releasing instead of again depressing the switch.

The control mechanism has the advantage of increasing the work output of the press; decreasing operator fatigue; eliminating the need for highly skilled operators; and eliminating accidental whipping of the work with consequent spoilage and possible injury to the operator. In addition the controls are flexible, and the mechanism facilitates safety precautions as, for example, by the use of multiple switches connected in series instead of a single switch, particularly when large sheets are being handled by two men.

It will be understood that while I have shown and described the invention in several forms, changes may be made without departing form the scope of the invention, as sought to be defined in the following claims. In the claims the term "clutch" is intended to include a clutch brake. The term "manual switch" is intended to include bodily operated switches including a foot switch. The reference to the limit switches as "up," "down" and as "preset stop" corresponding to initial engagement of the work by the ram, are all approximate, and individual operators may have different preferences in respect to the timing of the operation, some of the reasons for which have been explained above. The term "slip engagement" of the clutch is intended to mean a rapidly pulsed engagement and disengagement which does not literally stop and start the high inertia parts of the press, but rather results in an averaged motion, which for practical purposes is not readily distinguishable from continuous slippage.

I claim:

1. A control for a press brake comprising a driving shaft running continuously, a driven shaft running intermittently, a bed, a ram operated by said driven shaft, a friction clutch engageable to cause said shafts to move said ram toward said bed and back again, a limit switch and means to operate it at the "up" position of the ram, a limit switch and means to operate it at the "down" position of the ram, and a third limit switch together with adjustable means to cause operation of said switch at a desired point corresponding to initial engagement of the work by the ram, an electrically controlled mechanism for causing either full engagement, slip engagement, or disengagement of the clutch, a manual switch, and circuitry interconnecting said limit switches, said mechanism, and said manual switch and so arranged that operation of the manual switch causes full clutch engagement until the ram reaches the work, and a succeeding movement of said manual switch causes slip engagement of said clutch for slow movement until the bottom limit switch is operated, whereupon the engagement of the clutch is changed from slip to full until the ram has been raised to top position, when the clutch is disengaged.

2. A control for a press brake comprising a driving shaft carrying a flywheel and running continuously at uniform speed, a driven shaft running intermittently, a stationary bed, a ram, pitman mechanism operated by said driven shaft and connected to said ram, a friction clutch engageable to cause said shafts to move said pitman and ram toward said bed and back again, a limit switch and means to operate it at the "up" position of the ram, a limit switch and means to operate it at the "down" position of the ram, and a third limit switch together with adjustable means to cause operation of said switch at a desired point corresponding to initial engagement of the work by the ram, an electrically controlled mechanism for causing either full engagement, slip engagement, or disengagement of the clutch, a foot switch, and circuitry interconnecting said limit switches, said mechanism, and said foot switch and so arranged that operaton of the foot switch causes full clutch engagement until the ram reaches the work, and a succeeding movement of said foot switch causes slip engagement of said clutch for slow bending of the work until the bottom limit switch is operated, whereupon the engagement of the clutch is changed from slip to full until the ram has been raised to top position, when the clutch is disengaged.

3. A control for a press brake comprising a driving shaft running continuously, a driven shaft running intermittently, a bed, a ram operated by said driven shaft, a friction clutch engageable to cause said shafts to move said ram toward said bed and back again, a limit switch and means to operate it at the "up" position of the ram, a limit switch and means to operate it at the "down" position of the ram, and a third limit switch together with adjustable means to cause operation of said switch at a desired point corresponding to initial engagement of the work by the ram, an electrically controlled mechanism for causing either full engagement, slip engagement, or disengagement of the clutch, a manual switch, and circuitry interconnecting said limit switches, said mechanism, and said manual switch and so arranged that operation of the manual switch causes full clutch engagement until the ram reaches the work, and a succeeding movement of said manual switch causes slip engagement of said clutch for slow work until the bottom limit switch is operated, whereupon the engagement of the clutch is changed from slip to full until the ram has been raised to top position, when the clutch is disengaged, said electrically controlled mechanism comprising a solenoid and linkage connected to a part of the clutch to cause full engagement of the clutch, and means to energize the solenoid with a pulsed instead of continuous current to cause slip engagement.

4. A control for a press brake comprising a driving shaft carrying a flywheel and running continuously at uniform speed, a driven shaft running intermittently, a stationary bed, a ram, pitman mechanism operated by said driven shaft and connected to said ram, a friction clutch engageable to cause said shafts to move said pitman and ram toward said bed and back again, a limit switch and means to operate it at the "up" position of the ram, a limit switch and means to operate it at the "down" position of the ram, and a third limit switch together with adjustable means to cause operation of said switch at a desired point corresponding to initial engagement of the work by the ram, an electrically controlled mechanism for causing either full engagement, slip engagement, or disengagement of the clutch, a foot switch, and circuitry interconnecting said limit switches, said mechanism, and said foot switch and so arranged that operation of the foot switch causes full clutch engagement until the ram reaches the work, and a succeeding movement of said foot switch causes slip engagement of said clutch for slow bending of the work until the bottom limit switch is operated, whereupon the engagement of the clutch is changed from slip to full until the ram has been raised to top position, when the clutch is disengaged, said electrically controlled mechanism comprising a solenoid and linkage connected to a part of the clutch to cause full engageemnt of the clutch, and means to energize the solenoid with a pulsed instead of continuous current to cause slip engagement.

5. A control for a press brake comprising a driving shaft running continuously, a driven shaft running intermittently, a bed, a ram, a friction clutch engageable to cause said shafts operated by said driven shaft to move said ram toward said bed and back again, a limit switch and means to operate it at the "up" position of the ram, a limit switch and means to operate it at the "down" position of the ram, and a third limit switch together with adjustable means to cause operation of said switch at a desired point corresponding to initial egnagement of the work by the ram, an electrically controlled mechanism for causing either full engagement, slip engagement, or disengagement of the clutch, a manual switch, and circuitry interconnecting said limit switches, said mechanism, and said manual switch and so arranged that operation of the manual switch causes full clutch engagement until the ram reaches the work, and a succeeding movement of said manual switch causes slip engagement of said clutch for slow work until the bottom limit switch is operated, whereupon the engagement of the clutch is changed from slip to full until the ram has been raised to top position, when the clutch is disengaged, said electrically controlled mechanism comprising a solenoid and linkage connected to a part of the clutch to cause full engagement of the clutch, means to energize the solenoid with a pulsed instead of continuous current to cause slip engagement, and adjustable timer means for timing the duration of the pulses and the duration of the intervals between pulses.

6. A control for a press brake comprising a driving shaft carrying a flywheel and running continuously at uniform speed, a driven shaft running intermittently a stationary bed, a ram, pitman mechanism operated by said driven shaft and connected to said ram, a friction clutch engageable to cause said shafts to move said pitman and ram toward said bed and back again, a limit switch and means to operate it at the "up" position of the ram, a limit switch and means to operate it at the "down" position of the ram, and a third limit switch together with adjustable means to cause operation of said switch at a desired point corresponding to initial engagement of the work by the ram, an electrically controlled mechanism for causing either full engagement, slip engagement, or disengagement of the clutch, a foot switch, and circuitry interconnecting said limit switches, said mechanism, and said foot switch and so arranged that operation of the foot switch causes full clutch engagement until the ram reaches the work, and a succeeding movement of said foot switch causes slip engagement of said clutch for slow bending of the work until the bottom limit switch is operated, whereupon the engagement of the clutch is changed from slip to full until the ram has been raised to top position, when the clutch is disengaged, said electrically controlled mechanism comprising a solenoid and linkage connected to a part of the clutch to cause full engagement of the clutch, means to energize the solenoid with a pulsed instead of continuous current to cause slip engagement, and adjustable timer means for timing the duration of the pulses and the duration of the intervals between pulses.

7. A control for a press brake comprising a driving shaft running continuously, a driven shaft running intermittently, a bed, a ram, a friction clutch engageable to cause said shafts operated by said driven shaft to move said ram toward said bed and back again, a limit switch and means to operate it at the "up" position of the ram, a limit switch and means to operate it at the "down" position of the ram, and a third limit switch together with adjustable means to cause operation of said switch at a desired point corresponding to initial engagement of the work by the ram, an electrically controlled mechanism for causing either full engagement, slip engagement, or disengagement of the clutch, a manual switch, and circuitry interconnecting said limit switches, said mechanism, and said manual switch and so arranged that operation of the manual switch causes full clutch engagement until the ram reaches the work, and a succeeding movement of said manual switch causes slip engagement of said clutch for slow work until the bottom limit switch is operated, whereupon the engagement of the clutch is changed from slip to full until the ram has been raised to top position, when the clutch is disengaged, said electrically controlled mechanism comprising a first solenoid and linkage connected to a part of the clutch to cause full engagement of the clutch, and a second optionally useable solenoid connected to the same linkage, and adjustable stop means to limit the motion of said second solenoid to cause slip engagement.

8. A control for a press brake comprising a driving shaft carrying a flywheel and running continuously at uniform speed, a driven shaft running intermittently a stationary bed, a ram, pitman mechanism operated by said driven shaft and connected to said ram, a friction clutch engageable to cause said shafts to move said pitman and ram toward said bed and back again, a limit switch and means to operate it at the "up" position of the ram, a limit switch and means to operate it at the "down" position of the ram, and a third limit switch together with adjustable means to cause operation of said switch at a desired point corresponding to initial engagement of the work by the ram, an electrically controlled mechanism for causing either full engagement, slip engagement, or disengagement of the clutch, a foot switch, and circuitry interconnecting said limit switches, said mechanism, and said foot switch and so arranged that operation of the foot switch causes full clutch engagement until the ram reaches the work, and a succeeding movement of said foot switch causes slip engagement of said clutch for slow bending of the work until the bottom limit switch is operated, whereupon the engagement of the clutch is changed from slip to full until the ram has been raised to top position, when the clutch is disengaged, said electrically controlled mechanism comprising a first solenoid and linkage connected to a part of the clutch to cause full engagement of the clutch, a second optionally useable solenoid connected to the same linkage, and adjustable stop means to limit the motion of said second solenoid to cause slip engagement.

9. A control for a press brake comprising a driving shaft running continuously, a driven shaft running intermittently, a bed, a ram operated by said driven shaft, a friction clutch engageable to cause said shafts to move said ram toward said bed and back again, a limit switch and means to operate it at the "up" position of the ram, a limit switch and means to operate it at the "down" position of the ram, and a third limit switch together with adjustable means to cause operation of said switch at a desired point corresponding to initial engagement of the work by the ram, an electrically controlled mechanism for causing either full engagement, slip engagement, or disengagement of the clutch, a manual switch, and circuitry interconnecting said limit switches, said mechanism, and said manual switch and so arranged that operation of the manual switch causes full clutch engagement until the ram reaches the work, and a succeeding movement of said manual switch causes slip engagement of said clutch for slow work until the bottom limit switch is operated, whereupon the engagement of the clutch is changed from slip to full until the ram has been raised to top position, when the clutch is disengaged, said electrically controlled mechanism comprising a first solenoid and linkage connected to a part of the clutch to cause full engagement of the clutch, a second optionally useable solenoid connected to the same linkage, or a resiliently yieldable connection between said second solenoid and said linkage to cause slip engagement.

10. A control for a press brake comprising a driving shaft carrying a flywheel and running continuously at uniform speed, a driven shaft running intermittently, a stationary bed, a ram, pitman mechanism operated by said driven shaft and connected to said ram, a friction clutch engageable to cause said shafts to move said pitman and ram toward said bed and back again, a limit switch and means to operate it at the "up" position of the ram, a limit switch and means to operate it at the "down" position of the ram, and a third limit switch together with adjustable means to cause operation of said switch at a desired point corresponding to initial engagement of the work by the ram, an electrically controlled mechanism for causing either full engagement, slip engagement, or disengagement of the clutch, a foot switch, and circuitry interconnecting said limit switches, said mechanism, and said foot switch and so arranged that operation of the foot switch causes full clutch engagement until the ram reaches the work, and a succeeding movement of said foot switch causes slip engagement of said clutch for slow bending of the work until the bottom limit switch is operated, whereupon the engagement of the clutch is changed from slip to full until the ram has been raised to top position, when the clutch is disengaged, said electrically controlled mechanism comprising a first solenoid and linkage connected to a part of the clutch to cause full engagement of the clutch, a second optionally useable solenoid connected to the same linkage, or a resiliently yieldable connection between said second solenoid and said linkage to cause slip engagement.

11. A control for a press brake comprising a driving shaft running continuously, a driven shaft running intermittently, a bed, a ram operated by said driven shaft, a friction clutch engageable to cause said shafts to move said ram toward said bed and back again, a limit switch and means to operate it at the "up" position of the ram, a limit switch and means to operate it at the "down" position of the ram, and a third limit switch together with adjustable means to cause operation of said switch at a desired point corresponding to initial engagement of the work by the ram, an electrically controlled mechanism for causing either full engagement, slip engagement, or disengagement of the clutch, a manual switch, and circuitry interconnecting said limit switches, said mechanism, and said manual switch and so arranged that operation of the manual switch causes full clutch engagement until the ram reaches the work, and a succeeding movement of said manual switch causes slip engagement of said clutch for slow work until the bottom limit switch is operated, whereupon the engagement of the clutch is changed from slip to full until the ram has been raised to top position, when the clutch is disengaged, said electrically controlled mechanism comprising a solenoid and linkage connected to a part of the clutch to cause full engagement of said clutch, and adjustable means to reduce the power supply of said solenoid to cause slip engagement.

12. A control for a press brake comprising a driving shaft carrying a flywheel and running continuously at uniform speed, a driven shaft running intermittently, a stationary bed, a ram, pitman mechanism operated by said driven shaft and connected to said ram, a friction clutch engageable to cause said shafts to move said pitman and ram toward said bed and back again, a limit switch and means to operate it at the "up" position of the ram, a limit switch and means to operate it at the "down" position of the ram, and a third limit switch together with adjustable means to cause operation of said switch at a desired point corresponding to initial engagement of the work by the ram, an electrically controlled mechanism for causing either full engagement, slip engagement, or disengagement of the clutch, a foot switch, and circuitry interconnecting said limit switches, said mechanism, and said foot switch and so arranged that operation of the foot switch causes full clutch engagement until the ram reaches the work, and a succeeding movement of said foot switch causes slip engagement of said clutch for slow bending of the work until the bottom limit switch is operated, whereupon the engagement of the clutch is changed from slip to full until the ram has been raised to top position, when the clutch is disengaged, said electrically controlled mechanism comprising a solenoid and linkage connected to a part of the clutch to cause full engagement of said clutch, and adjustable means to reduce the power supply of said solenoid to cause slip engagement.

13. A control for a press brake comprising a driving shaft running continuously, a driven shaft running intermittently, a bed, a ram operated by said driven shaft, a friction clutch engageable to cause said shafts to move said ram toward said bed and back again, a limit switch and means to operate it at the "up" position of the ram, a limit switch and means to operate it at the "down" position of the ram, and a third limit switch together with adjustable means to cause operation of said switch at a desired point corresponding to initial engagement of the work by the ram, an electrically controlled mechanism for causing either full engagement, slip engagement, or disengagement of the clutch, a manual switch, and circuitry interconnecting said limit switches, said mechanism, and said manual switch and so arranged that operation of the manual switch causes full clutch engagement until the ram reaches the work, and a succeeding movement of said manual switch causes slip engagement of said clutch for slow work until the bottom limit switch is operated, whereupon the engagement of the clutch is changed from slip to full until the ram has been raised to top position, when the clutch is disengaged, said electrically controlled mechanism comprising a first solenoid connected to a part of the clutch to cause full engagement of the clutch, and a second optionally useable solenoid connected to a part of the clutch to cause slip engagement.

14. A control for a press brake as defined in claim 13, in which each solenoid of the electrically controlled mechanism operates an air valve controlling the supply of air to an air cylinder connected through linkage to the clutch.

15. A control for a press brake as defined in claim 3, in which each solenoid of the electrically controlled mechanism operates an air valve controlling the supply of air to an air cylinder connected through linkage to the clutch.

16. A control for a press brake as defined in claim 5, in which each solenoid of the electrically controlled mechanism operates an air valve controlling the supply of air to an air cylinder connected through linkage to the clutch.

17. A control for a press brake as defined in claim 3, in which the means to pulse the solenoid for slip engagement includes electronic circuits with electronic switching tubes, said circuits affording a relatively high frequency pulse such that the amplitude of clutch movement is reduced to only a fraction of the full clutch movement, whereby the desired slippage is obtained smoothly, quietly, and with a minimum of wear.

18. A control for a press brake as defined in claim 3, in which the means to pulse the solenoid for slip engagement includes electronic circuits with electronic switching tubes controlled by at least two RC circuits with adjustable resistors, the adjustment of one of said RC circuits controlling the "on" time of the pulse, and the adjustment of the other RC circuit controlling the "off" time of the pulse, and said circuits affording a relatively high frequency pulse such that the amplitude of clutch movement is reduced to only a fraction of the full clutch movement, whereby the desired slippage is obtained smoothly, quietly, and with a minimum of wear.

19. A control for a press brake as defined in claim 4, in which the means to pulse the solenoid for slip engagement includes electronic circuits with electronic switching tubes, said circuits affording a relatively high frequency pulse such that the amplitude of clutch movement is reduced to only a fraction of the full clutch movement, whereby the desired slippage is obtained smoothly, quietly, and with a minimum of wear.

20. A control for a press brake as defined in claim 4, in which the means to pulse the solenoid for slip engagement includes electronic circuits with electronic switching tubes controlled by at least two RC circuits with adjustable resistors, the adjustment of one of said RC circuits controlling the "on" time of the pulse, and the adjustment of the other RC circuit controlling the "off" time of the pulse, and said circuits affording a relatively high frequency pulse such that the amplitude of clutch movement is reduced to only a fraction of the full clutch movement, whereby the desired slippage is obtained smoothly, quietly, and with a minimum of wear.

References Cited in the file of this patent

UNITED STATES PATENTS

| 2,065,820 | Mellon | Dec. 29, 1936 |
| 2,133,161 | Colbert | Oct. 11, 1938 |
| 2,237,170 | Williamson | Apr. 1, 1941 |